(12) United States Patent
Chang

(10) Patent No.: US 9,188,796 B2
(45) Date of Patent: Nov. 17, 2015

(54) SCREW-LESS JOINT STRUCTURE FOR EYEGLASS FRAMES AND TEMPLES

(71) Applicant: ACTION EYEWEAR CORP., Taipei (TW)

(72) Inventor: Szu-I Chang, Taipei (TW)

(73) Assignee: ACTION EYEWEAR CORP., Taipei (TW)

(*) Notice: Subject to any disclaimer, the term of this patent is extended or adjusted under 35 U.S.C. 154(b) by 41 days.

(21) Appl. No.: 14/274,713

(22) Filed: May 10, 2014

(65) Prior Publication Data

US 2015/0070648 A1    Mar. 12, 2015

(30) Foreign Application Priority Data

Sep. 6, 2013   (TW) .............................. 102216813 U

(51) Int. Cl.
  *G02C 5/22*    (2006.01)
  *G02C 1/08*    (2006.01)
(52) U.S. Cl.
  CPC ................ *G02C 5/2209* (2013.01); *G02C 1/08* (2013.01); *G02C 5/2254* (2013.01); *G02C 2200/12* (2013.01); *G02C 2200/18* (2013.01); *G02C 2200/22* (2013.01)
(58) Field of Classification Search
  CPC ...... G02C 5/22; G02C 5/2209; G02C 5/2254; G02C 1/08; G02C 2200/12; G02C 2200/18; G02C 2200/22

USPC ....................... 351/153, 90–102, 106; 16/228
See application file for complete search history.

(56) References Cited

U.S. PATENT DOCUMENTS

| 4,360,252 A | 11/1982 | Solomon | |
| 7,344,242 B2* | 3/2008 | Habermann | .................. 351/156 |
| 8,827,444 B1* | 9/2014 | Koo | .............................. 351/121 |

FOREIGN PATENT DOCUMENTS

| DE | 195419 C | 8/1906 |
| DE | 202011002016 U1 | 3/2011 |
| DE | 202010013198 U1 | 5/2011 |
| JP | 2002296547 A | 10/2002 |
| WO | WO9210153 A1 | 6/1992 |

* cited by examiner

*Primary Examiner* — Scott J Sugarman
*Assistant Examiner* — Kristina Deherrera
(74) *Attorney, Agent, or Firm* — Li & Cai Intellectual Property (USA) Office

(57) ABSTRACT

The present disclosure provides a joint structure for eyeglass frames and temples. An eyeglass frame and two temples are connected by the joint structure, which has two bases and a bidirectional screw rod. Since the assembly of the bases and the bidirectional screw rod is simple and quick, labor and cost of assembly is saved and the joint structure is an innovative eyeglass structure.

2 Claims, 5 Drawing Sheets

SCREW-LESS JOINT STRUCTURE FOR EYEGLASS FRAMES AND TEMPLES

BACKGROUND OF THE INVENTION

1. Field of the Invention

The present disclosure relates to a screw-less joint structure for eyeglass frames and temples; in particular, to a joint structure for connecting eyeglass frames and temples.

2. Description of Related Art

The frames and the two temples of a traditional eyeglass structure are typically connected by screws. When assembling screws, screw drivers are necessary. Therefore, labor and time are wasted, increasing production cost. Moreover, after a period of time screws might rust and become loose, which is troublesome for users. Therefore, the industry has developed a screw-less connection structure for eyeglass frames and temples. Since typical screw-less connection structures on the current market have complicated structures and tedious assembly process, improvements can be made.

SUMMARY OF THE INVENTION

The object of the present disclosure is to provide a screw-less joint structure for eyeglass frames and temples, including two bases and a bidirectional screw rod. The joint structure simply and quickly connects the two temples to the eyeglass frame, such that the two temples can rotate about the respective joint structures to an open or closed condition.

In order to achieve the aforementioned objects, the present disclosure has the following technical features.

A joint structure for eyeglass frames and temples is provided. The eyeglass structure includes a frame, two temples and two lenses. The lenses are respectively mounted at the rims of the frame. The outer side of each of the rims is formed with two insertion arms and a groove therebetween. The joint end of each of the temples has three engagement arms.

The joint structure for eyeglass frames and temples includes two bases and a bidirectional screw rod. The bases each have an insertion slot for engagement with the insertion arms of the rims. Each of the bases has a curved edge and an L-shaped edge. The inner side of each of the base is formed with a screw hole. The top end and the bottom end of the bidirectional screw rod each have a threaded shank. The threaded shanks can be respectively screwed into the screw holes of the two bases. The middle engagement arm of each of the temples is a curved structure. The inner side of the curved structure has a curved groove. The curved structure hugs the bidirectional screw rod, which passes through the curved groove. The upper engagement arm and the lower engagement arm of each of the temples are respectively accommodated at the L-shaped edges of the two bases. Through the joint structures, the two temples can open on the eyeglass frame, or closed on the eyeglass frame.

In order to further the understanding regarding the present disclosure, the following embodiments are provided along with illustrations to facilitate the disclosure of the present disclosure.

DETAILED DESCRIPTION OF THE PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

Figure 1:
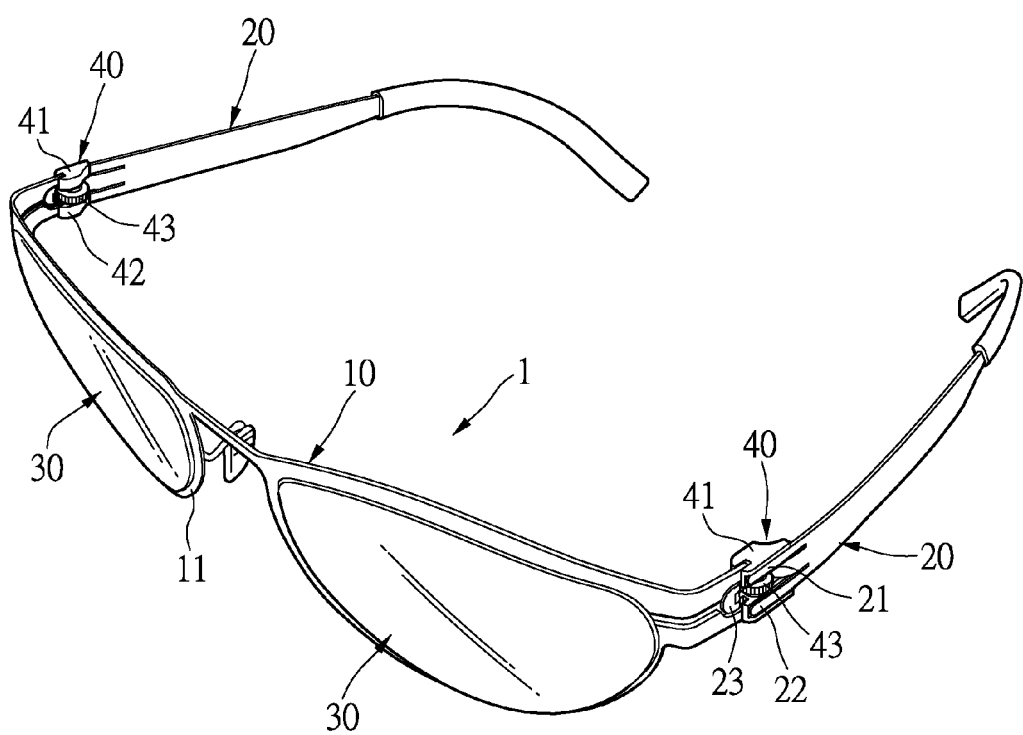
FIG. 1 shows a perspective view of an embodiment according to the present disclosure.
Figure 2:
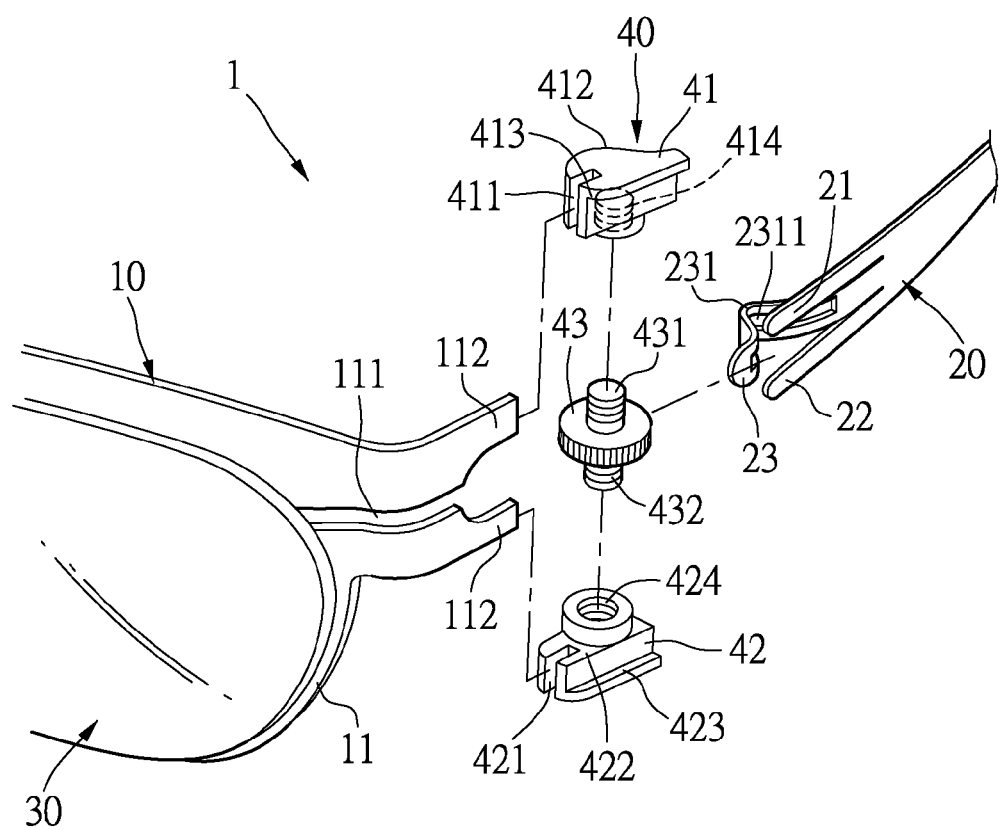
FIG. 2 shows an exploded view of an embodiment according to the present disclosure.

Referring to FIG. 1 and FIG. 2, the eyeglass structure 1 of the present disclosure includes a frame 10, two temples 20 and two lenses 30. The lenses 30 are respectively mounted at the rims 11 of the frame 10. The outer side of each of the rims 11 is formed with two insertion arms 112 and a groove 111 therebetween. The joint end of each of the temples has three engagement arms 21, 22, 23. The two flexible metal temples 20 are connected to the frame 10 by a screw-less method having the following technical features.

Figure 3:
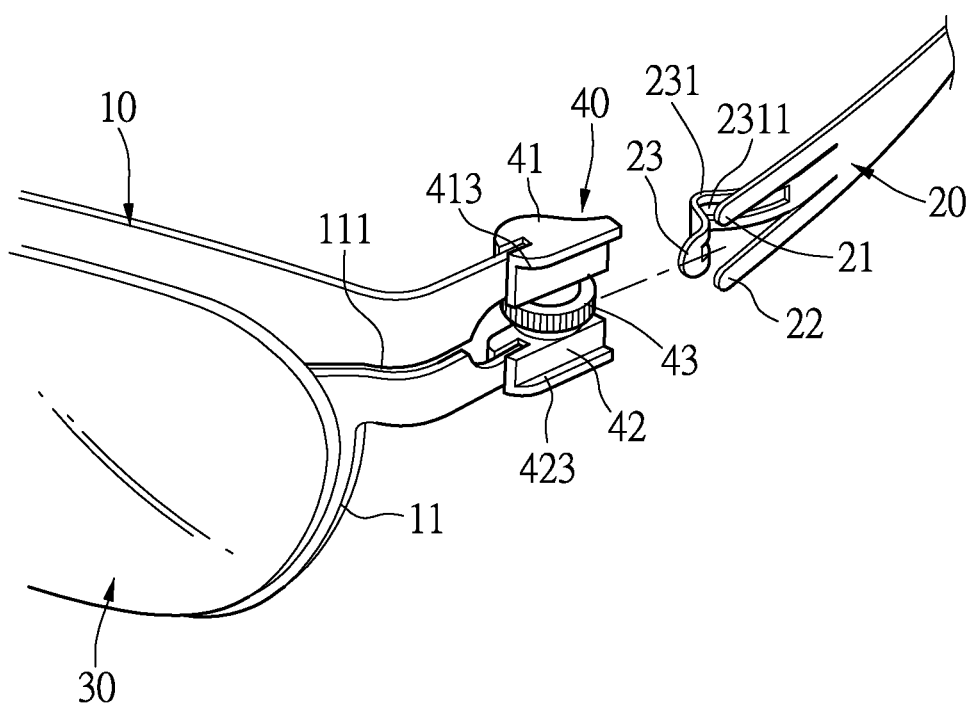
FIG. 3 shows a view of an eyeglass frame mounted with a joint structure according to the present disclosure.

The joint structure 40 for the frame 10 and the temples 20 includes two bases 41, 42, and a bidirectional screw rod 43. Referring to FIG. 3, the lenses 30 are first mounted at the rims 11 of the frame 10, and the groove 111 of the frame 11 is not sealed. When the temple 20 is to be assembled, the two insertion arms 112 of the rim 11 are respectively inserted into insertion slots 411, 421 of the two bases 41, 42. Each of the bases 41, 42 has a curved edge 412, 422 and an L-shaped edge 413, 423. The inner side of each of the base 41, 42 is formed with a screw hole 414, 424. The top end and the bottom end of the bidirectional screw rod 43 each have a threaded shank 431, 432. The threaded shanks 431, 432 can be respectively screwed into the screw holes 414, 424 of the two bases 41, 42. When the bidirectional screw rod 43 is screwed tight, the groove 111 of the frame 11 of the eyeglass structure 10 is closed, and the lens 30 is fastened.

Figure 4:
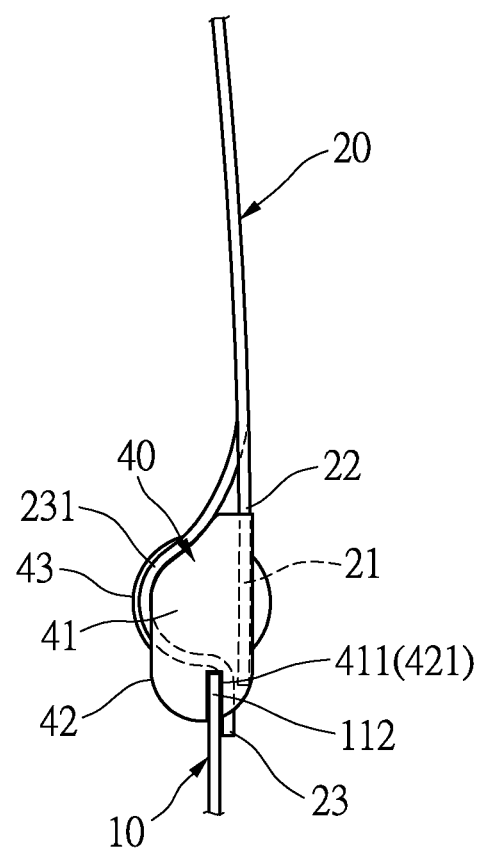
FIG. 4 shows a top view of an assembled embodiment according to the present disclosure (in an open state)
Figure 5:
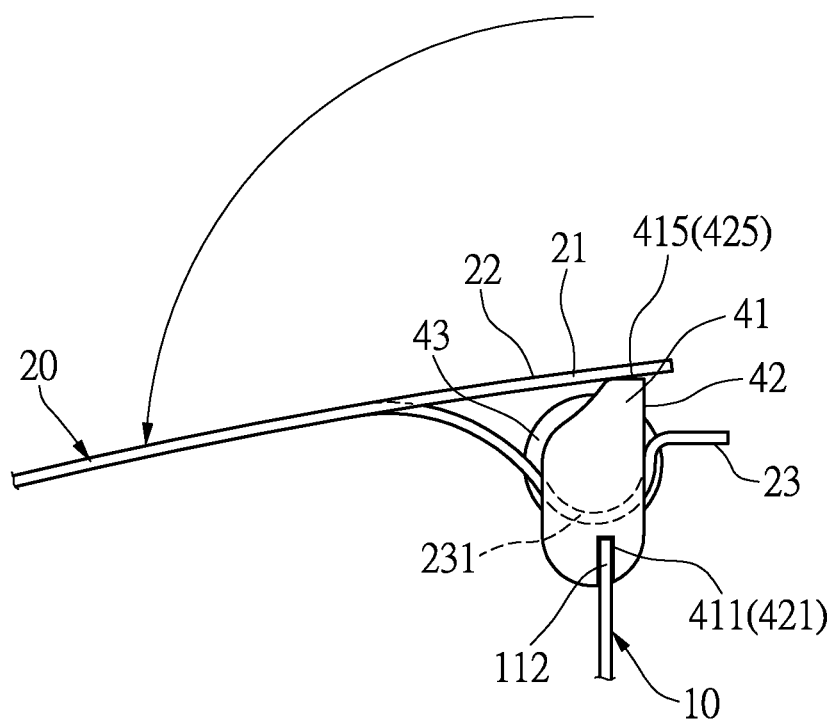
FIG. 5 shows another top view of an assembled embodiment according to the present disclosure (in a closed state).

Then, the two temples 20 are respectively engaged with the joint structures 40. The middle engagement arm 23 of each of the temples 20 is a curved structure 231, curving inward and offset from the upper engagement arm 21 and the lower engagement arm 22. The inner side of the curved structure 231 has a curved groove 2311. The curved structure 231 of the middle engagement arm 23 hugs the bidirectional screw rod 43, which passes through the curved groove 2311 of the curved structure 231. The upper engagement arm 21 and the lower engagement arm 22 are respectively accommodated at the L-shaped edges 413, 423 of the two bases 41, 42 of the joint structure 40. As shown in FIG. 4, the temple 20 is in an open state. When the temple 20 is to be closed on the eyeglass structure 1, as shown in FIG. 5, the temple 20 can be folded substantially by 90 degrees inward about the joint structure 40, the upper engagement arm 21 and the lower engagement arm 22 respectively abut the edges 415, 425 of the bases 41, 42, and the curved groove 2311 of the middle engagement arm 23 is curved and spans the bidirectional screw rod 43.

In summary of the above, the join structure for eyeglass frames and temples of the present disclosure uses two bases and a bidirectional screw rod to assemble two temples to a frame by a screw-less method. The present disclosure has a simple structure and is easy to assemble, and is an innovative product out of screw-less connection structures for eyeglass frames and temples. The present disclosure is practical, not previously disclosed, and in compliance with the requirements of patent law, and patent thereof is respectfully applied for.

What is claimed is:

1. A joint structure for eyeglass frames and temples, wherein the eyeglass structure includes a frame, two temples and two lenses, the lenses are respectively mounted on the rims of the frame, a side of each of the rims is formed with a groove, an outer side of each of the rims is formed with two insertion arms, a joining end of each of the temples includes three engagement arms, and the joint structure is characterized in that:

the joint structure for eyeglass frames and temples comprises two bases and a bidirectional screw rod, the bases each have an insertion slot for engagement with the respective insertion arm, the base has a curved edge and an L-shaped edge, an inner side of each of the bases is formed with a screw hole, a top end and a bottom end of the bidirectional screw rod each have a threaded shank for being respectively screwed into the screw holes of the two bases, a middle engagement arm of the temple is a curved structure, an inner side of the curved structure has a curved groove, the curved structure hugs the bidirectional screw rod which passes through the curved groove, an upper engagement arm and a lower engagement arm of the temple are respectively accommodated at the L-shaped edges of the two bases; and through the joint structures, the two temples are open on the eyeglass frame, or closed on the eyeglass frame.

2. The joint structure for eyeglass frames and temples according to claim 1, wherein the two temples are made of flexible metal.

* * * * *